March 21, 1944.  E. E. HEWITT  2,344,869
PISTON MECHANISM
Filed April 30, 1943
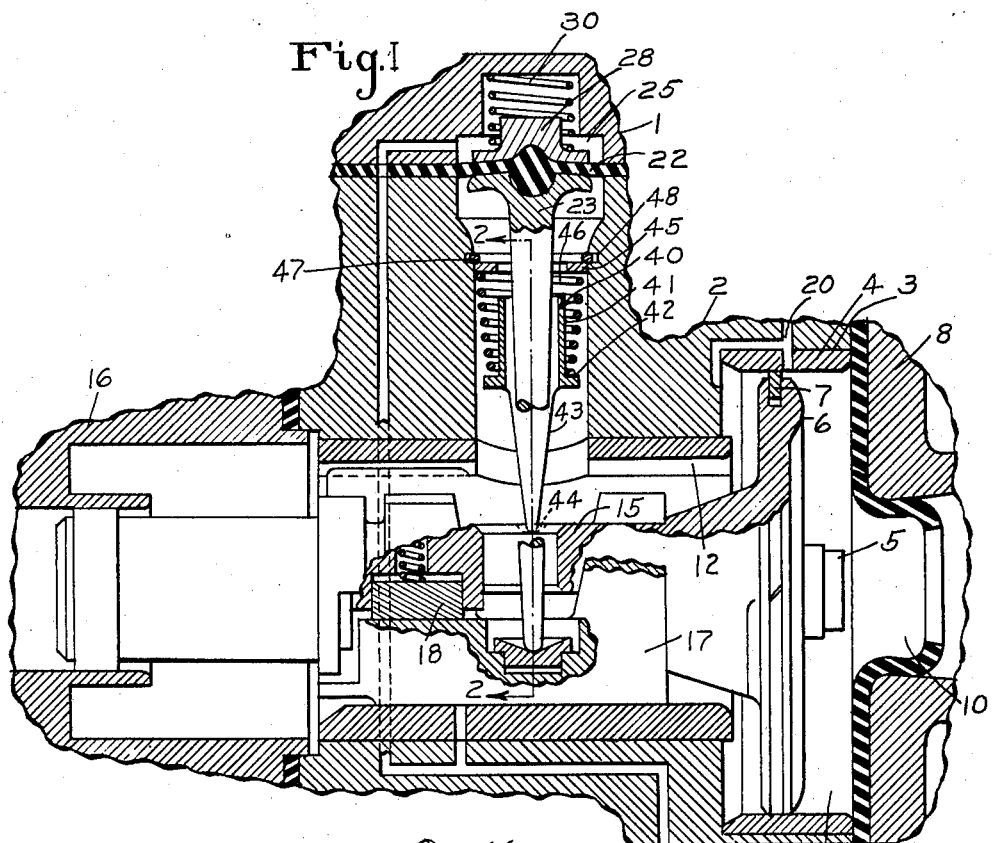
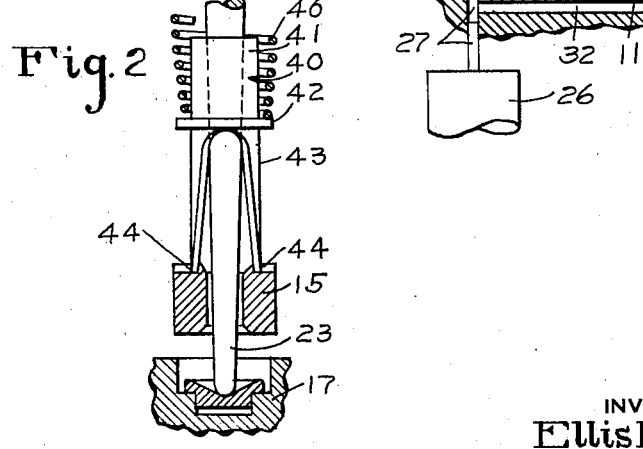
INVENTOR
Ellis E. Hewitt
BY
*A. L. Vincill*
ATTORNEY Patented Mar. 21, 1944

2,344,869

UNITED STATES PATENT OFFICE 2,344,869

PISTON MECHANISM

Ellis E. Hewitt, Edgewood, Pa., assignor to The Westinghouse Air Brake Company, Wilmerding, Pa., a corporation of Pennsylvania Application April 30, 1943, Serial No. 485,193

8 Claims. (Cl. 303—1)

This invention relates to valve devices and more particularly to the type embodying a piston arranged to be moved by a differential between fluid pressures acting on its opposite sides.

In air brake devices, such as employed on railway vehicles, pistons are employed for operation upon a change in air pressure in a control pipe and thereby on one side of the piston, to effect an application of the brakes on the vehicle, a release of the brakes, or other desired brake controlling operations. The pistons are arranged to reciprocate in cylinder bores, and in accordance with usual practice, the pistons comprise piston heads of a diameter somewhat less than that of the bores and each head is therefore provided with a ring groove carrying a ring which is expanded into contact with the wall of the respective bore to provide a leak tight seal between the piston and the wall.

Due to the fact that the diameter of a piston head, such as above described, is slightly less than that of the bore in which it operates, the piston head is capable of a certain degree of radial movement relative to the ring and the wall of the piston bore. This relative movement is slight and resisted by friction between the ring and the side walls of the ring groove in the piston head. Nevertheless, in a brake device applied to a railway vehicle which at times is subject to severe shocks, due for instance to the vehicle wheels striking uneven joints between the rails in a track, the resulting vibrations set up in the vehicle are liable to cause such relative movement between a piston head and the wall of the bore in which it operates as to undesirably create hammer-like blows between the piston head and the wall. In time these blows may result in a groove being worn in the wall of the bore at either side of the ring where the piston head comes in contact with said wall. If the piston is arranged with its axis horizontal, the grooves may be worn only in one side of the cylinder wall, but if its axis is vertical the grooves may extend completely around the wall. In brake controlling valve devices, such as the "AB" and other types of devices, this grooving of the piston wall is most likely to occur in the brake release position since the piston occupies this position the major portion of the time, that a vehicle is in use.

This grooving of a cylinder wall is of course very objectionable, particularly in air brake devices, because it tends to create or increase leakage of fluid under pressure from one side of the piston to the other and thereby reduce its sensitivity to variations in fluid pressure on one side thereof, and in case the leakage becomes sufficiently great, it might even result in failure of the piston to respond to a normal variation in fluid pressure. Moreover, the piston head or ring is liable to catch on a side of the grooves worn in the bore and as a consequence require a greater than normal pressure differential to start it moving out of its release position. In such a case, when it does start moving, it might then jump or overtravel a desired position and thereby cause an undesired operation.

One object of the invention is to provide novel means which will eliminate the above mentioned difficulty.

Another object of the invention is to provide novel spring means for holding a piston head against radial movement relative to the wall of the bore in which it is disposed to operate.

Other objects and advantages will be apparent from the following more detailed description of the invention.

In the accompanying drawing, Fig. 1 is a sectional view of a portion of a fluid pressure brake device embodying the invention; Fig. 2 is a sectional view taken on line 2—2 of Fig. 1.

The invention is shown in the drawing associated with a portion of a brake controlling valve device 1, which for the purpose of illustration may be the emergency portion of the well known "AB" type of control valve device disclosed in Patent No. 2,031,213, issued to Clyde C. Farmer on February 18, 1936. Since reference may be made to this patent, only such parts of the "AB" valve device which are considered pertinent to the invention are shown in the drawing, and the following description of such parts will also be limited to only those parts deemed necessary for a clear and comprehensive understanding of the invention.

As shown, in the drawing, the brake controlling valve device 1 comprises a casing 2 having at one end a bore 3 which is lined with a bushing 4 having in turn a bore in which is slidably mounted a piston 5. The piston 5 comprises a piston head 6 of a diameter slightly less than that of the bore in bushing 4. The piston head is provided around its periphery with a groove in which is mounted a ring 7 expanded into contact with the wall of said bore, the ring being provided to prevent leakage of fluid under pressure from one side of the piston to the opposite side.

The bore in the bushing 4 is open at one end of the casing 2 and this open end is closed by a cover member 8, only a portion of which is shown in the accompanying drawing. In the "AB" valve device disclosed in the patent above referred to, the cover 8 constitutes a pipe bracket for supporting the casing 2 and through this pipe bracket, by way of cavity 10, communication is established between the usual brake pipe (not shown) on the vehicle and a chamber 11 provided between the piston head 6 and the cover member 8. At the opposite side of the piston 5 is a valve chamber 12. The piston has a stem 15 extending through this chamber into the bore of a bushing rigidly mounted in a cover member 16 wherein the end of the stem is supported and arranged to slide upon reciprocation of piston 5.

The piston stem 15 is constructed and arranged to operate a main slide valve 17 and an auxiliary slide valve 18 contained in the valve chamber 12, the auxiliary slide valve being movable relative to the main slide valve a limited distance, as is well known and also disclosed in the aforementioned Farmer patent. This chamber is connected to chamber 11 at the opposite side of the piston by way of a port 20, in the usual manner, when the piston is in the position shown in the drawing, so that the pressures on opposite sides of the piston are normally equalized.

For the purpose of maintaining the main slide valve 17 in engagement with its seat when the pressure of fluid in chamber 12 is reduced, a loading mechanism is provided. It will be understood by reference to the aforementioned patent that the venting of fluid under pressure from valve chamber 12 occurs when an emergency application of the brakes is effected. The mechanism may comprise a flexible diaphragm 22 which is mounted in the casing and operatively engages a rocking pin 23 through which a loading force is adapted to be transmitted from the diaphragm to the main slide valve 17. The valve chamber 12 is open to the underside of the diaphragm and at the other side of the diaphragm there is a chamber 25 which, in the present embodiment of the invention, is connected to the usual emergency reservoir 26 by way of a passage and pipe 27. Contained in the diaphragm chamber 25 and interposed between and operatively engaging the casing and a spring seat member 28, which is in operative engagement with the diaphragm 22, is a coil spring 30 which acts to hold the main slide valve 17 to its seat when the device is being shipped.

In accordance with the teachings of the hereinbefore mentioned Farmer patent, the emergency reservoir is charged with fluid under pressure through a passage 32 which is connected to passage 27 and which extends through the pipe bracket to the usual service portion (not shown).

In the drawing the piston 5 is shown in its brake release position which it occupies for the major portion of the time a railway vehicle is in use. The piston is arranged to move from this position through its full traverse in the direction of the cover or pipe bracket 8 to its emergency brake application position upon an emergency reduction in pressure of fluid in chamber 11, and to move back from its emergency position to the position in which it is shown upon a subsequent increase in pressure in chamber 11 to effect a release of the brakes.

According to the invention the rocking pin 23 extends through a member 40 comprising a cylindrical portion 41 having a spring seat 42 and a forked portion 43. The lower or outer ends of the forked portion engages the piston stem 15 within recesses 44 formed in the upper side of said piston stem. Interposed between and operatively engaging the spring seat 42 and a spring seat 45 is a spring 46 which spring is initially compressed when installed. The spring seat 45 is maintained in position by means of a snap ring 47 disposed in a recess 48 provided in the casing 2.

When these parts are assembled as shown in the drawing, it will be noted that the spring 46 acts, through the medium of member 40 and piston stem 15, to urge the piston head 6 radially downwardly into contact with a portion of the bushing 4. The force of the spring 46 thus applied to the piston head 6 is such as to hold said head against radial movement relative to the bushing 4 to avoid grooving of said bushing under vibrating conditions such as above described.

Operation of the piston 6 and stem 15 from the position in which they are shown, in a direction toward the right-hand, first effects the limited movement of the auxiliary slide valve 18 relative to the main slide valve 17. Such movement causes the lower end of member 40 to rock relative to the rocking pin 23, there being sufficient clearance between the inner wall of the member 40 and the rocking pin 23 to provide for such relative rocking.

As the piston and stem continue to move in the same direction, the stem picks up the main slide valve 17 and moves the auxiliary and main slide valves in unison. When this occurs the lower end of member 40 and the lower end of rocking pin 23 also rock in unison. Reverse movement of the piston and stem first causes the main and auxiliary slide valves to move in unison so that the members 40 and rocking pin 23 rock in unison for a limited distance. Continued reverse movement of the piston and stem causes the auxiliary slide valve to move relative to the main slide valve and the member 40 to rock relative to the rocking pin 23.

Having now described my invention, what I claim as new and desire to secure by Letters Patent, is:

1. The combination with a casing having a piston bore, a piston head mounted to reciprocate in said bore, and a slide valve subject on its seating face to fluid under pressure, of a stem projecting from said head for moving said slide valve, a pin loosely extending through an aperture in said stem and engaging said slide valve, means acting on said pin for exerting a seating pressure on said slide valve, a member surrounding said pin and engaging said stem, and means acting on said member for exerting pressure on said stem to maintain the said piston head against the wall of said bore.

2. The combination with a casing having a piston bore, a piston head mounted to reciprocate in said bore, a slide valve subject on its seating face to fluid under pressure, of a stem projecting from said head for moving said slide valve, a pin loosely extending through an aperture in said stem and engaging said slide valve, means acting on said pin for exerting a seating pressure on said slide valve, a member surrounding said pin and engaging said stem, and means interposed between said casing and said member for exerting pressure on said stem to maintain said piston head against the wall of said bore.

3. The combination with a casing having a piston bore, a piston head mounted to reciprocate in said bore, a slide valve subject on its seating face to fluid under pressure, of a stem projecting from said head for moving said slide valve, a pin loosely extending through an aperture in said stem and engaging said slide valve, means acting on said pin for exerting a seating pressure on said slide valve, a member surrounding said pin, said member being provided with a forked end having rocking engagement with said stem, a spring acting on said member and thereby said stem to urge said head radially against the wall of said bore.

4. The combination with a casing having a piston bore, a piston head mounted to reciprocate in said bore, a slide valve subject on its seating face to fluid under pressure, of a stem projecting from said head for moving said slide valve, a strut mechanism acting on said slide valve for urging same against its seat, a member having rocking engagement with said stem, and spring means interposed between said member and the wall of said casing for actuating said stem to urge said head radially against the wall of said bore, said spring means comprising a spring seat carried by the casing, a coil spring interposed between said member and said spring seat.

5. The combination with a casing having a piston bore, a piston head mounted to reciprocate in said bore, a slide valve subject on its seating face to fluid under pressure, of a stem projecting from said head for moving said slide valve, a pin loosely extending through an aperture in said stem and engaging said slide valve, means acting on said pin for exerting a seating pressure on said slide valve, and spring means surrounding said pin and acting on said stem for actuating same to press said piston head against the wall of said bore, said last mentioned means comprising a coil spring and a push rod having rocking engagement with said stem for transmitting the pressure of said spring to said stem.

6. The combination with a casing having a piston bore, a piston head mounted to reciprocate in said bore, a slide valve subject on its seating face to fluid under pressure, of a stem projecting from said head for moving said slide valve, said stem having an opening therethrough, of a pin loosely extending through said opening in said stem and engaging said slide valve, means acting on said pin for exerting a seating pressure on said slide valve, a member surrounding said pin, said member being provided with a forked end bridging said opening and engaging the upper surface of said stem at two sides of said opening, a spring acting on said member and thereby said stem to urge said head radially against the wall of said bore.

7. The combination with a casing having a piston bore and a piston comprising a piston head mounted for reciprocation in said bore, of a main slide valve and an auxiliary slide valve movable relative to the main slide valve, a stem carried by said head for actuating said main and auxiliary slide valves, said stem and auxiliary slide valve being movable a limited distance relative to said main slide valve, pressure means for exerting seating pressure on said main slide valve, a second pressure means encircling the first mentioned pressure means for exerting pressure on said stem to maintain said piston head in contact with the wall of said piston bore, said second pressure means being movable by said stem relative to the first mentioned pressure means as said auxiliary slide valve is being moved relative to said main slide valve.

8. The combination with a casing having a piston bore, a piston comprising a piston head mounted for reciprocation in said bore, and also having a valve chamber, of a main slide valve and an auxiliary slide valve disposed in said chamber, a stem carried by said head for actuating said main and auxiliary slide valves, said stem and auxiliary slide valve being movable a limited distance relative to said main slide valve, a bore in said casing, said bore being open to said valve chamber, pressure means disposed in said bore for exerting seating pressure on said main slide valve, a second pressure means disposed in said bore and encircling the first mentioned pressure means for exerting pressure on said stem to maintain said piston head in contact with the wall of said piston bore, said second pressure means being movable by said stem relative to the first mentioned pressure means as said auxiliary slide valve is being moved relative to said main slide valve.

ELLIS E. HEWITT.